Dec. 12, 1944.  O. C. MARTIN  2,364,864
METHOD OF MANUFACTURING VALVE BODIES
Filed April 20, 1940
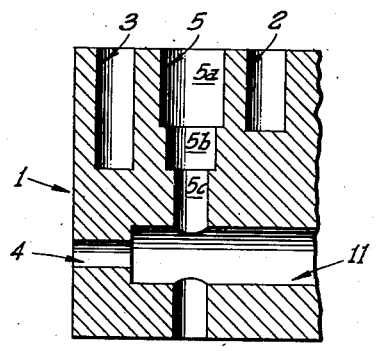
FIG. 1.
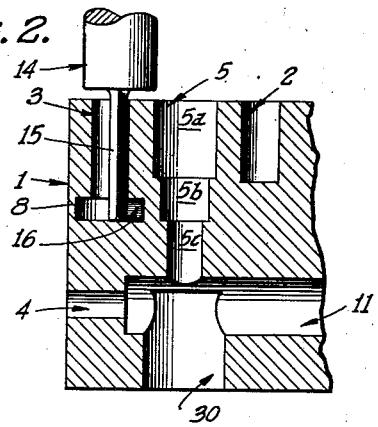
FIG. 2.
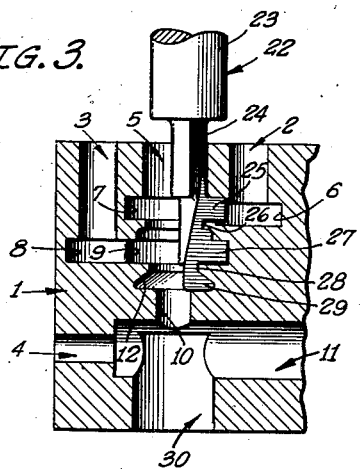
FIG. 3.
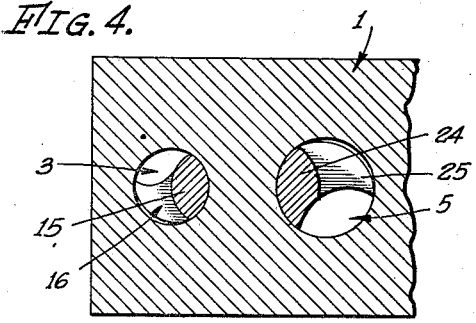
FIG. 4.
FIG. 5.
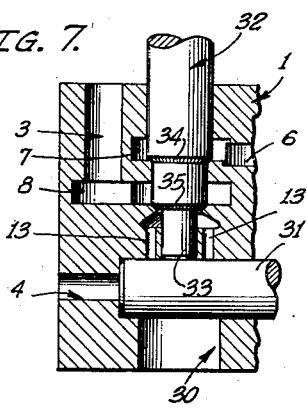
FIG. 7.
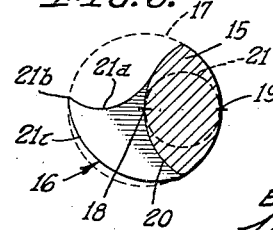
FIG. 6.
OTIS C. MARTIN
INVENTOR
By Harold W. Mattingly
ATTORNEY Patented Dec. 12, 1944

2,364,864

UNITED STATES PATENT OFFICE 2,364,864

METHOD OF MANUFACTURING VALVE BODIES

Otis C. Martin, Los Angeles, Calif.

Application April 20, 1940, Serial No. 330,752

1 Claim. (Cl. 29—157.1)

My invention relates to a method of making valves and has particular reference to a method of manufacturing fluid control valves and tools for use therein.

In my copending application Serial No. 323,376, filed March 11, 1940, entitled "Valve," I have described and claimed a novel fluid valve construction which is particularly adapted for use in air craft for controlling various types of fluid power apparatus. The particularly notable advantages inherent in this new valve reside in its small size, light weight, and inexpensive construction. The present invention is directed to certain methods of valve manufacture by means of which this new valve may be readily and inexpensively constructed and to certain tools which may be used in the practice of the method.

Valves of the character disclosed in my aforementioned copending application employ a plurality of bores and chambers, a part of which are used to house valve members and a part of which constitute fluid entrance and exit openings. These bores and chambers are provided with various enlargements which function as fluid passages, and certain of these are disposed in intersecting relation with enlargements of adjacent bores to provide a fluid intercommunication between bores. Prior to my invention these bores and enlargements had to be formed by destructible cores employed in connection with the casting of cast valve bodies or, in the case of valves requiring a valve body of greater strength and higher quality than could be obtained by casting, by means of boring tools requiring the use of a separate tool for each bore and enlargement thereof and frequently requiring a separate and distinct "set up" of the boring machine for each operation. Such methods of manufacture are expensive and time consuming.

It is therefore an object of my invention to provide a method of manufacturing valve bodies which eliminates the need for using separate boring tools for each different bore or enlargement thereof.

It is also an object of my invention to provide a method of manufacturing valve bodies which consists in simultaneously cutting a plurality of enlargements in a valve bore.

It is a further object of my invention to provide a method of manufacturing valve bodies which consists in first boring a pilot hole and then machining the bore to the final desired configuration by a single machining operation.

Other objects and advantages of my invention will be apparent from a study of the following specifications, read in connection with the accompanying drawing, wherein:

Fig. 1 is a fragmentary sectional view illustrating the manner in which a valve body is preliminarily bored prior to employing the tools of my invention to provide the desired enlargements therein;

Fig. 2 is a view similar to Fig. 1 but illustrating the manner in which a boring tool of my invention may be employed for providing an enlargement in one of the bores illustrated in Fig. 1;

Fig. 3 is a view similar to Fig. 2 but illustrating the manner in which another boring tool of my invention may be employed for simultaneously forming a plurality of enlargements within the valve body;

Fig. 4 is a cross sectional view illustrating the manner in which the tools shown in Figs. 2 and 3 are received in their respective bores prior to the commencement of a boring operation;

Fig. 5 is a view similar to Fig. 4 but illustrating the position of the tools at the conclusion of the boring operation;

Fig. 6 is a cross sectional view of the shank of a boring tool of my invention; and Fig. 7 is a view similar to Fig. 3 but illustrating the manner in which the method of my invention may be employed for accurately locating valve seats relative to a cam shaft bore.

I have illustrated in the accompanying drawing the various steps which may be employed in the practice of the method of my invention as directed to the forming of a valve body of the character used in a valve such as that disclosed and claimed in my copending application Serial No. 323,376, filed March 11, 1940, entitled "Valve." The valve which is disclosed in that application employs a valve body 1 (see Fig. 3) within which is provided an inlet port 2, a discharge port 3, an exhaust port 4 and a valve chamber bore 5. The inlet port 2 is provided at its lower end with an enlargement 6 thereof which intersects an upper enlargement 7 formed within the valve chamber bore 5. Similarly, the discharge bore 3 is provided at its lower end with an enlargement 8 which intersects a similarly disposed enlargement 9 formed in the valve chamber bore 5.

The valve chamber bore 5 is provided with a guiding bore 10 formed as a smaller diameter extension of the chamber 5 which guiding bore intersects a laterally extending cam shaft bore 11 which is in turn formed as an enlarged diameter continuation of the exhaust port 4. The guiding bore 10 is employed in the valve disclosed in my aforementioned copending application as a guide for receiving a valve stem and a fluid passage around this portion of the bore 10 is obtained by providing a third enlargement 12 of the valve chamber 5 which may be intersected by means of a plurality of smaller bores 13 (see Fig. 7) extending between the cam shaft bore 11 and the enlargement 12.

The valve stem which is received within the guiding bore 10 carries an upper valve member which is adapted to close off the bore 5 between the enlargements 7 and 9 and a lower valve member adapted to close off the bore 5 between the enlargements 9 and 12, these valve members being arranged on the valve stem in such manner as to be selectively actuated by a cam which is rotatably mounted within the cam shaft bore 11. This mechanism is so arranged that when the cam shaft is moved to one position, the upper valve member is lifted to provide a fluid intercommunication between the inlet port 2 and the discharge port 3 by way of the enlargements 6, 7, 8 and 9. The cam shaft is also arranged in such manner that when moved to another position, the lower valve member is raised providing for the interconnection of the discharge port 3 with the exhaust port 4 by way of the enlargements 8, 9, 12 and the auxiliary bores 13.

The ensuing description of the method of valve manufacture of my invention will be directed to the forming of these bores and enlargements, it being understood, however, that this particular form of valve body is employed for illustrative purposes only and that the methods described hereinafter may be used with equal facility on other types of valve bodies.

The valve body 1 preferably comprises a rectangular block of metal into which pilot bores forming the ports 2 and 3 are drilled (either individually or simultaneously) by means of conventional drilling or boring apparatus. Another pilot bore corresponding to the valve chamber bore 5 may also be bored individually or simultaneously with the bores 2 and 3 by employing a step type of drill or milling cutter adapted to form a bore having an upper large diameter portion 5a, an intermediately disposed medium diameter portion 5b, and a lower small diameter portion 5c.

The enlargements 6 and 8 which are to be formed at the lower ends of the bores 2 and 3 may be conveniently bored by means of a boring tool such as that illustrated in Figs. 2 and 6. This tool preferably comprises a bar portion 14 adapted to be carried in the tool carriage of a suitable boring machine or engine lathe. The bar 14 bears on its outermost end a shank portion 15 which terminates in a cutter portion 16.

The block 1 is mounted for rotation about the axis of the bore to be enlarged (such as the bore 3 in Fig. 2) as by clamping the block 1 securely to the face plate or in a chuck of an engine lathe. The bar portion 14 is suitably mounted on the tool carriage of the lathe and the carriage is moved to such position as to insert the tool within the bore 3 to the desired depth. The block 1 is then rotated and the tool is moved laterally relative to the axis of rotation of the block 1 so as to bring the cutter portion 16 thereof into engagement with the walls of the bore and remove the material therefrom to provide the enlargement 8.

The manner in which the tool is constructed is illustrated in Fig. 6 wherein the cutter portion 16 and the shank portion 15 are illustrated as being formed integrally with each other and integrally with the bar portion 14. In employing this method of manufacturing the tool, a bar portion 14 of any desired size is first turned as by means of a lathe to a cylinder having a diameter slightly smaller than the diameter of the bore 3 as is indicated by the dotted line 17 in Fig. 6 and having a length somewhat in excess of the depth of the bore 3. This cylindrical portion may be formed in a lathe by rotating the bar 14 about its longitudinal axis indicated by reference character 18 in Fig. 6. The shank portion 15 is then formed by cutting away the material from one side of the cylindrical portion 17. This may be done by mounting the cylinder 17 for rotation in a lathe about an axis such as that indicated at 19 in Fig. 6 and cutting the material by means of a lathe tool along a surface 20 which is concentrically disposed relative to the axis 19 and which has a radius of curvature equal to the radius of the cylindrical portion 17.

Since it is desired to retain a maximum amount of material to serve as the shank portion 15 in order that the strength thereof may be maintained at a maximum, the offset between the axes 18 and 19 is so adjusted as to permit the surface 20 to be brought into contact with the sides of the bore 3 at the time the tip of the cutter 16 has reached its maximum lateral penetration to form the enlargement 8. The offset between the axes 18 and 19 will be found to be equal to one-half the difference in diameter between the bore in which the tool is to be inserted and the diameter of the enlargement to be cut therein. For example, if it is desired to cut a one inch diameter enlargement in a ⅝ diameter bore, the offset between the axes 18 and 19 will be 3/16 of an inch or one-half of ⅜, the difference between one inch and ⅝ of an inch.

I have indicated by means of a dotted circle 21 in Fig. 6 the maximum permissible diameter which could be employed on the shank 15 if that shank were formed of cylindrical cross section. It will be observed that a substantial increase in the amount of material retained in the shank 15 is achieved by forming the shank with a lenticular cross section as above described, and attention is further directed to the fact that the long axis of this cross section is extended in the direction to best withstand the forces imposed thereon by the engagement of the cutter 16 with the block 1. After the shank 15 is formed, the upper part of the circular member remaining at the outermost end thereof is cut away along a line 21a to provide an upper tool face having the proper rake to give whatever cutting angle is desired at the cutting edge 21b of the cutter portion 16. Similarly, the underside of the cutter portion 16 is preferably relieved along a surface 21c to provide for the required clearance between the flank of the tool and the work.

I have illustrated in Fig. 4 the relation of the cutter 16 and the shank 15 with the bore 3 at the time the cutter is inserted in the bore preparatory to cutting the enlargement 8. I have also illustrated in Fig. 5 the relationship between these parts at the time the cutting of the recess 8 is completed.

The above described method of manufacturing the tool may also be employed for constructing another tool 22 (see Fig. 3) which may be employed for forming the enlargements 7, 9 and 12 simultaneously. The tool 22 may comprise a bar portion 23 adapted to be secured in the tool carriage of an engine lathe and from the outermost end of which is extended a shank portion 24. The shank portion carries a cutter member 25 adapted to cut the enlargement 7 and a continuing shank portion 26 is extended from the cutter 25 to carry a cutter 27 adapted to cut the aforementioned enlargement 9. Similarly, another continuing shank portion 28 is extended from the cutter 27 to support a cutter portion 29 adapted to cut the aforementioned enlargement 12. Each of the shank portions 24, 26 and 28 is preferably formed with the aforementioned lenticular cross section in order to obtain the maximum possible strength in these shank portions.

The principles set forth hereinbefore for the forming of the shank portion 15 may be applied as well to the forming of these shank portions, due regard being had to the varying diameter portions 5a, 5b, and 5c of the valve chamber bore 5.

I have illustrated also in Figs. 4 and 5 the relative positions occupied by the tool 22 and the valve chamber bore 5 before the boring of the enlargements is begun and after this boring operation is completed.

After the enlargements 7, 9 and 12 have been formed, that portion of the bore 5c which is disposed on the opposite side of the cam shaft bore 11 from the bores 2 and 3 is enlarged as indicated at 30 in Fig. 7 to permit the insertion therein of one or more small drills for the purpose of boring the holes 13 which extend from the cam shaft bore 11 into communication with the enlargement 12.

The valve members which are employed in the valve which is disclosed in my aforementioned copending application are adapted to engage seats formed on the upper ends of the constricted portions lying between the enlargements 7 and 9 and between the enlargements 9 and 12, respectively. These valve seats should be accurately positioned vertically with respect to the cam shaft bore 11 in order to insure proper cooperation between these valve members and the cam shaft which is received within the bore 11.

I have devised a novel method of obtaining the proper accurate disposition of these valve seats which consists in inserting within the cam shaft bore 11 a dummy cam shaft 31 and employing a valve seat reamer 32 which carries on its lower end a stop 33 adapted to engage the dummy cam shaft 31 when reamer portions 34 and 35 thereof are disposed the proper distances from the cam shaft bore 11. The reaming tool 32 is inserted in the bore 5 and the reaming of the valve seats is begun. As this reaming operation continues, the valve seats are gradually lowered until such time as the stop member 33 comes into contact with the dummy cam shaft 31 to prevent further downward movement of the reaming tool. In order to prevent inaccuracies resulting from wear of the stop member and the dummy cam shaft 31, these members are preferably of hardened material capable of withstanding the pressure and wear to which they would be subjected in quantity production methods.

It will be observed that by this means the valve seats are accurately positioned relative to the cam shaft bore 11, a condition which cannot be achieved by locating the valve seats from some reference plane such as the top of the valve block 1 and attempting to locate the cam shaft bore 11 relative to this same surface for the reason that in the drilling of the cam shaft bore 11, the drill will creep a slight amount so as to cause an improper positioning of the valve seats relative to the bore.

From the foregoing it will also be observed that I have devised a novel method of manufacturing valve bodies which eliminates the need for using separate boring tools for each different valve body or enlargement thereof for the reason that all of the enlargements within a single bore may be formed simultaneously in a single machining operation.

It will also be apparent that I have provided a novel boring tool and method of making the same which provides a maximum amount of material in the shank portion of the tool interconnecting the cutter with the supporting bar portion and that this shank material is disposed in such configuration as to achieve the maximum strength and rigidity.

While I have, in the foregoing, described the method of my invention as practised in the manufacture of a particular type of valve such as that disclosed in my aforementioned copending application, it will be readily apparent to those skilled in the art that the same novel methods and principles may be applied to the manufacture of valve bodies of various types and in fact may be applied to the forming of bores having enlargements and recesses in metal parts of various descriptions.

While I have shown and described the preferred embodiment of my invention, I do not desire to be limited to any of the details of construction shown or described herein, except as defined in the appended claim.

I claim:

The method of manufacturing a valve body having a valve chamber bore therein communicating at spaced points with different ones of a pair of fluid port bores disposed parallel to said valve chamber bore which consists in drilling parallel pilot bores in said body from one face thereof at the desired location of said fluid port bores, inserting in said pilot bores a boring tool having a cutting element thereon and employing said tool to cut enlargements of said pilot bores spaced inwardly different distances therealong, drilling said valve chamber bore in said body from said one face and parallel to said pilot bores, and inserting in said valve chamber bore another boring tool having cutting elements spaced longitudinally of each other and employing said other boring tool to enlarge said valve chamber bore at spaced points sufficiently to intersect the enlargements cut in said pilot bores.

OTIS C. MARTIN.